US007890245B2

(12) United States Patent
Breitbach et al.

(10) Patent No.: US 7,890,245 B2

(45) Date of Patent: Feb. 15, 2011

(54) DIAGNOSTIC METHOD AND DEVICE FOR CONTROLLING AN INTERNAL COMBUSTION ENGINE

(75) Inventors: Thomas Breitbach, Stuttgart (DE); Achim Friedel, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/083,114

(22) PCT Filed: Sep. 7, 2006

(86) PCT No.: PCT/EP2006/066103

§ 371 (c)(1), (2), (4) Date: Aug. 19, 2009

(87) PCT Pub. No.: WO2007/039391

PCT Pub. Date: Apr. 12, 2007

(65) Prior Publication Data

US 2010/0004842 A1 Jan. 7, 2010

(30) Foreign Application Priority Data

Oct. 4, 2005 (DE) ...................... 10 2005 047 350

(51) Int. Cl.

| | |
|---|---|
| ***F02D 41/14*** | (2006.01) |
| ***F02D 41/22*** | (2006.01) |
| ***G06F 19/00*** | (2006.01) |
| ***G06F 11/30*** | (2006.01) |
| ***G01M 19/00*** | (2006.01) |

(52) U.S. Cl. ...................... 701/114; 701/109; 123/688; 123/690; 73/114.72; 702/185

(58) Field of Classification Search ................ 123/479, 123/672, 674, 679, 688, 690, 693; 701/101–103, 701/109, 114, 115; 73/23.32, 114.69, 114, 73/71–114.73; 702/58, 182, 183, 185, 187

See application file for complete search history.

(56) References Cited

U.S. PATENT DOCUMENTS

| | | | | |
|---|---|---|---|---|
| 4,843,558 | A * | 6/1989 | Bergmann et al. | 701/101 |
| 4,881,505 | A * | 11/1989 | Tomisawa | 123/480 |
| 4,947,818 | A | 8/1990 | Kamohara | |
| 6,273,076 | B1 * | 8/2001 | Beck et al. | 123/679 |
| 6,474,323 | B1 * | 11/2002 | Beck et al. | 123/679 |
| 6,550,307 | B1 * | 4/2003 | Zhang et al. | 73/114.73 |
| 6,735,552 | B2 * | 5/2004 | Franke et al. | 702/185 |
| 7,320,309 | B2 * | 1/2008 | Michalske et al. | 701/109 |

FOREIGN PATENT DOCUMENTS

| | | |
|---|---|---|
| DE | 196 12 212 | 10/1996 |
| DE | 102 21 376 | 11/2003 |
| EP | 0 824 187 | 2/1998 |
| JP | 1-318736 | 12/1989 |

* cited by examiner

*Primary Examiner*—Willis R Wolfe, Jr.

(74) *Attorney, Agent, or Firm*—Kenyon & Kenyon LLP

(57) ABSTRACT

A device and a method for controlling an internal combustion engine, in which an actual value is determined based on a lambda value and compared with a setpoint value. Based on the comparison, a correction value for a controlled variable is determined and stored. An error is detected if the correction value changes abruptly.

6 Claims, 2 Drawing Sheets

DIAGNOSTIC METHOD AND DEVICE FOR CONTROLLING AN INTERNAL COMBUSTION ENGINE

BACKGROUND INFORMATION

A method and a device for controlling an internal combustion engine in which an actual value is determined based on a lambda value and compared with a setpoint value is described, for example, in German Patent No. DE 102 21 376. A correction value for a controlled variable, in particular for an air mass signal and/or a fuel mass signal, is determined based on the comparison of the actual value and the setpoint value and is stored.

When controlling internal combustion engines, components used for controlling the internal combustion engine must be monitored for errors. Errors in which increased emissions or increased power of the internal combustion engine occur due to an increased supply of fuel are regarded as particularly problematic.

According to the present invention, an error is detected based on the comparison of two correction values. In particular, an old, stored correction value is compared with a new correction value. According to the present invention, it was recognized that specific errors occur suddenly and thus result in an abrupt change of the correction value.

Therefore, it is particularly advantageous if an error is detected when the correction value changes by more than one threshold value since a previous determination. This means in particular that a check is performed to determine whether the correction value has changed by more than one threshold value since it was last determined. In this way, it is possible to reliably detect an abrupt change of the correction value. It is advantageous in particular if a timing condition is considered in this process, i.e., the threshold value is specified as a function of the time since the last determination or the change of the correction value is weighted with time. Only the time during which the internal combustion engine is operated is considered.

Such a procedure makes it possible in particular to detect unauthorized interventions in the control which result in increased power of an internal combustion engine due to an increased quantity of fuel injected.

Errors relating to the injection components, e.g., the injectors, are detected particularly reliably. It is particularly advantageous if emergency operation is initiated when an error is detected. This may be implemented, for example, by operating the internal combustion engine at significantly reduced power. It is particularly advantageous if the correction values are documented when an error is detected. This makes it possible to detect and document an unauthorized intervention in the control.

DETAILED DESCRIPTION

Figure 1:
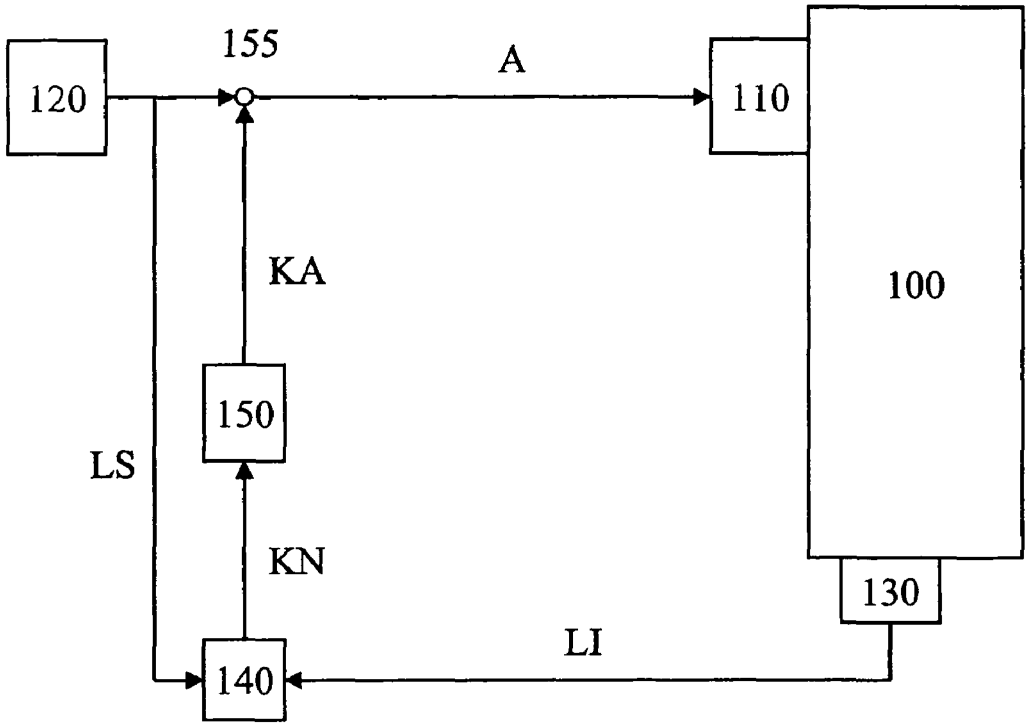
FIG. 1 shows a block diagram of the device according to the present invention.

FIG. 1 shows important elements of the device of the present invention in the form of a block diagram. The internal combustion engine is denoted as 100. At least one control element 110 is assigned to it. Control element 110 may be used to adjust the air volume supplied to the internal combustion engine and/or the quantity of fuel supplied to the internal combustion engine. Preferably, one control element 110 is assigned to each cylinder of the internal combustion engine. Only one of these control elements is shown in FIG. 1. This applies in particular to the control elements that influence fuel metering. Control signal A which is applied to control element 110 is specified by a controller 120. In this process, controller 120 normally considers the driver input and additional operating variables of the combustion engine, operating variables of the vehicle and/or ambient conditions.

In addition, at least one sensor 130 is situated on internal combustion engine 100. This sensor 130 delivers a signal LI which characterizes the oxygen concentration in the exhaust gas of the internal combustion engine. Controller 120 delivers a signal LS which characterizes the setpoint value of a regulator 140. Signal LS of controller 120 relating to the setpoint value and output signal LI of sensor 130 are supplied as an actual value to the regulator. Based on the comparison between the setpoint value and the actual value of a variable characterizing the oxygen concentration in the exhaust gas, regulator 140 specifies a correction value KN which acts on a correction 150. Correction value KN is stored in correction 150, preferably as a function of the operating state of the internal combustion engine. As a function of the operating state of the internal combustion engine, output signal KA of correction 150 reaches connecting point 155, the output signal of control 120 being present at its second output and control signal A for control element 110 being present at its input.

A corresponding method is described, for example, in German Patent No. DE 102 21 376. Controller 120 specifies output signal A as a function of the operating state and the driver input and the control element adjusts the air volume or quantity of fuel supplied to the internal combustion engine. Sensor 130 is used to detect the lambda value of the exhaust gas. This lambda value indicates actual lambda value LI of the exhaust gas. Controller 120 specifies setpoint value LS which corresponds to the desired lambda value desired for this operating state. In an ideal control, these values coincide. Normally, the individual components have tolerances, with the consequence that different quantities of fuel and/or air volumes are metered with the same control signal. This in turn causes actual lambda value LI to deviate from desired lambda value LS. As a function of the comparison of the actual and the desired lambda values, regulator 140 specifies the correction value in such a way that the actual value approaches the setpoint value.

Preferably, this correction value K is stored in a memory in correction 150. Normally, this correction value is only determined and stored in specific operating states. This makes it possible to use this correction value in other operating states as well and also to carry out a corresponding correction there.

The embodiment of FIG. 1 has only been selected as an example; instead of the lambda value, it is also possible to supply other variables to regulator 140. For example, the quantity of fuel injected or to be injected may be calculated based on the lambda value and the air volume, and this may be compared with the corresponding setpoint value of the control. This means that variables derived from the lambda signal or variables that were calculated using the lambda signal may also be supplied to regulator 140.

The quantity of fuel may be increased by manipulation and/or errors in the control, thus increasing the power output of the internal combustion engine. Such a manipulation may result in engine damage. Such unauthorized interventions are reliably detected using the method of the present invention described below.

The lambda regulation is preferably active during full load operation and is designed as an adaptive learning function. This means that correction values K are determined during full load operation and stored in correction 150. The correction value is determined based on the deviation of the actual value from the setpoint value. These correction values or learned values are used during normal operation for correcting the quantity of fuel injected and/or the air volume. Normally, the quantities of fuel injected or the air volumes change due to tolerances or drift phenomena of the individual components only relatively slowly, so that the correction values also change only slightly. If, however, a strong change occurs within a short time, this is interpreted as an undesirable change, caused, for example, by a malfunction, an error and/or an undesired manipulation. Such a change may arise, for example, due to a failure of an injection valve. Such a failure is caused, for example, by damage to a mechanical part of the injector or other components, which results in an abrupt change of the quantity of fuel injected. Such changes must be reliably detected, since they may result in increased power output of the engine, engine damage and/or increased emission of pollutants, in particular unburnt hydrocarbons and particles. If the control is manipulated with the objective of increasing power, this also results in a sudden change of the learned values.

Monitoring of the correction values over time makes it possible to reliably detect both cases and the vehicle may be brought into a safe operating state. In addition, the correction values are stored in the control device for a later readout as evidence of the manipulation carried out.

According to the present invention, the time curve of the correction values is checked for plausibility. If the correction values change abruptly, indicating an increasing quantity of injected fuel, damage to the system or manipulation of the same may be assumed. Preferably, this is the case only if an increase occurs at a plurality of operating points.

Figure 2:
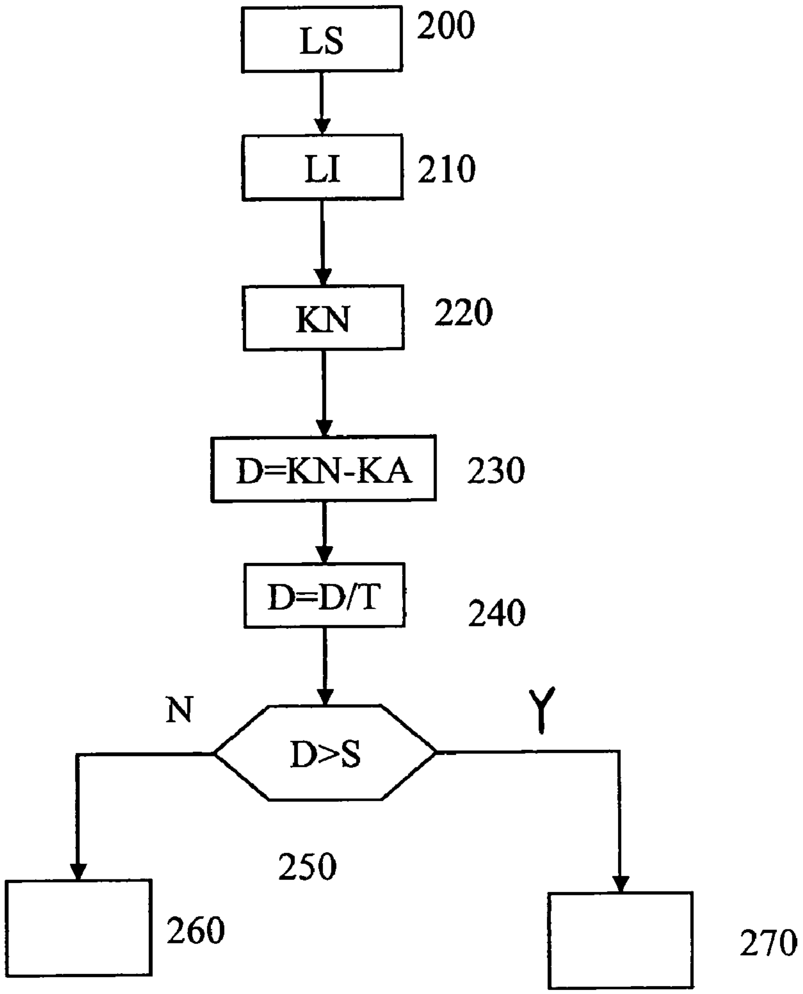
FIG. 2 shows a diagram of the method according to the present invention.

The method of the present invention is shown in FIG. 2 in the form of a flow chart. In a first step 200, control 120 determines setpoint value LS. In subsequent step 210, actual value LI is determined. Preferably it is supplied by sensor 130 or the actual value is calculated based on the sensor signal. Subsequently, new correction value KN is calculated in step 220. In subsequent step 230, difference D between new correction value KN and a correction value KA calculated at an earlier point in time is formed. In subsequent step 240, this difference D is weighted with a time variable T. Subsequent query 250 checks if difference D is greater than a threshold value S. If this is not the case, the program continues with the normal control program in step 260. If this is the case, this means that a correction value has changed significantly and thus corresponding measures are taken in step 270. It may be provided that emergency operation is initiated in which the internal combustion engine is operated at significantly reduced power. In an extreme case, the result of this may be that the internal combustion engine is shut down. In addition or as an alternative, it may be provided that the correction values, in particular the old and the new correction values, are stored in a non-erasable memory. This means that the storage of the correction values documents a possible intervention, in particular its point in time.

Step 240 presents/shows a particularly advantageous embodiment and may also be omitted. If the correction values are determined at regular time intervals, this step may be omitted. This means that in a simplified embodiment, it is only checked if correction value K changes significantly between two determinations. The embodiment shown in step 240 is particularly advantageous when weighting is done with respect to time. This is done, for example, by weighting change D with the time since the last detection of the correction value. In the simplest embodiment, the change is divided by time T. As an alternative, it may also be provided that in the case of greater time intervals, a greater change is allowed than in short intervals for determining the correction values.

Another embodiment which is not shown provides that errors are detected only if the correction values change abruptly at a plurality of operating points.

What is claimed is:

1. A device for controlling an internal combustion engine, comprising:

- means for determining an actual value based on a lambda value;
- means for comparing the actual value with a setpoint value;
- means for determining a correction value for a controlled variable based on the comparison;
- means for storing the correction value; and
- means for detecting an error if the correction value changes abruptly.

2. A method for controlling an internal combustion engine, comprising:

- determining an actual value based on a lambda value;
- comparing the actual value with a setpoint value;
- determining a correction value for a controlled variable based on the comparison;
- storing the correction value; and
- detecting an error if the correction value changes abruptly.

3. The method according to claim 2, wherein an error is detected if the correction value changes by more than one threshold value since a previous determination.

4. The method according to claim 2, further comprising detecting an unauthorized intervention in the control.

5. The method according to claim 2, wherein an error is detected in an area of injection components.

6. The method according to claim 2, further comprising at least one of (a) initiating an emergency operation when an error is detected and (b) documenting correction values when an error is detected.

* * * * *